United States Patent [19]

Ohkubo et al.

[11] Patent Number: 5,204,301

[45] Date of Patent: Apr. 20, 1993

[54] NON-REDUCTION TYPE DIELECTRIC CERAMIC COMPOSITION

[75] Inventors: Shinichi Ohkubo; Yoshiaki Mori; Yoshihiro Yoshimoto; Harufumi Mandai, all of Nagaokakyo, Japan

[73] Assignee: Murata Manufacturing Co., Ltd., Japan

[21] Appl. No.: 906,534

[22] Filed: Jun. 30, 1992

[30] Foreign Application Priority Data

Jan. 31, 1992 [JP] Japan .................................. 4-16500

[51] Int. Cl.$^5$ .............................................. C04B 35/49
[52] U.S. Cl. ...................................... 501/136; 501/135
[58] Field of Search ................................ 501/135, 136

[56] References Cited

FOREIGN PATENT DOCUMENTS 0228667 7/1987 European Pat. Off. .
0227769 12/1984 Japan .................................. 501/136
3289707 11/1988 Japan .
3289708 11/1988 Japan .
3289709 11/1988 Japan .

Primary Examiner—Mark L. Bell
Assistant Examiner—Deborah Jones
Attorney, Agent, or Firm—Ostrolenk, Faber, Gerb & Soffen

[57] ABSTRACT

A non-reduction type dielectric ceramic composition, which contains 100 parts by weight of $(Ca_{1-x}Sr_x)_m(Zr_{1-y}Ti_y)O_3 - zMnO_2 - wSiO_2$ serving as a main component and 2 to 30 parts by weight of an additive which is $a(LiO_{1K} - RO) - (1-a)(BO_{3/2} - SiO_2)$, where RO is at least one type of SrO, BaO and CaO, and a is not less than 0.01 nor more than 0.8 in terms of a molar ratio, and satisfies the following relationships in the composition formulas of the above described main component and additive: x, y and m satisfy the following relationships in terms of a molar ratio:

$x \leq x \leq 1.0$
$0 \leq y \leq 0.2$
$0.9 \leq m \leq 1.1$ and z and w satisfy the following relationships when the amount of $(Ca_{1-x}Sr_x)_m(Zr_{1-y}Ti_y)O_3$ is 100% by weight:

$0.1 \leq z \leq 5\%$ by weight
$0.3 \leq w \leq 8\%$ byw weight.

4 Claims, No Drawings

NON-REDUCTION TYPE DIELECTRIC CERAMIC COMPOSITION

BACKGROUND OF THE INVENTION

1. Field of the Invention

The present invention relates generally to a dielectric ceramic composition suitable for use in a dielectric resonator, a filter, a multilayer capacitor or the like for high frequencies, and more particularly, to a non-reduction type dielectric ceramic composition sinterable at low temperatures which is high in Q value, has stable temperature characteristics, and can be sintered simultaneously with a material constituting inner electrodes such as silver or copper.

2. Description of the Prior Art

Inner electrodes in a dielectric resonator, a filter, a multilayer capacitor or the like used in a high frequency band must be constituted by a material which is low in resistance loss in the high frequency band. Consequently, the inner electrodes must be constituted by a metal material having high conductivity such as silver or copper. Further, as an effective way to miniaturize the above described electronic component, the electronic component is constructed as a monolithic type electronic component obtained by laminating ceramics while being separated by inner electrodes, followed by cofiring. In this case, however, it is required that dielectric ceramics sintered simultaneously with the above described material constituting inner electrodes is one which can be sintered simultaneously with the above described material constituting electrodes having a relatively low melting point, that is, can be sintered at temperatures of not more than 1000° C. in addition to being high in Q value and low in temperature dependence of dielectric constant $\epsilon$. In addition, when copper is used as the material constituting inner electrodes, it is required that the dielectric ceramics is a non-reduction type material so as to prevent the oxidation of the copper.

Japanese Patent Laid-Open Gazette No. 55815/1988 has proposed a dielectric ceramic composition of a BaO-SrO-SiO$_2$-ZrO$_2$-Al$_2$O$_3$ system to meet the above described various requirements.

Furthermore, it has been known from Japanese Patent Laid-Open Gazette No. 131415/1987 that a particular additive component is added to a dielectric ceramic composition of a Ca(ZrTi)O$_3$ system, so that the dielectric ceramic composition can be sintered at temperatures of not more than 1200° C. and a high temperature coefficient and stable temperature characteristics can be achieved.

However, a material system disclosed in Japanese Patent Laid-Open Gazette No. 55815/1988 has the disadvantage in that the dielectric constant $\epsilon$ is 10, which is small, and the temperature coefficient of $\epsilon$ easily varies depending on the sintering conditions, that is, is unstable.

Furthermore, in a material system disclosed in Japanese Patent Laid-Open Gazette No. 131415/1987, the lower limit of the sintering temperature is 1030° C., which is relatively high. Consequently, the material system has the disadvantage in that when copper is used as a material constituting inner electrodes, electrodes made of copper are melted and agglomerated and are diffused to a dielectric body, so that the absolute value of the temperature coefficient of $\epsilon$ becomes larger than 30 ppm/°C.

SUMMARY OF THE INVENTION

An object of the present invention is to provide a non-reduction type dielectric ceramic composition capable of obtaining dielectric ceramics which can be sintered at temperatures of not more than approximately 1000° C. so that copper can be used as a material constituting electrodes, is high in Q value and dielectric constant, and has stable temperature characteristics of dielectric constant.

The present invention has been made so as to achieve the above described object and is characterized by containing 100 parts by weight of $(Ca_{1-x}Sr_x)_m(Zr_{1-y}Ti_y)O_3$-zMnO$_2$-wSiO$_2$ as a main component and 2 to 30 parts by weight of $a(LiO_{\frac{1}{2}}\text{-RO})\text{-}(1-a)(BO_{3/2}\text{-SiO}_2)$, where RO is at least one type of SrO, BaO and CaO, and a is not less than 0.01 nor more than 0.8 in terms of a molar ratio, as an additive.

MAIN COMPONENT

In the above described main component, x, y and m must satisfy the following relationships in terms of a molar ratio:

$0 \leq x \leq 1.0$
$0 \leq y \leq 0.2$
$0.9 \leq m \leq 1.1$.

Furthermore, when the amount of $(Ca_{1-x}Sr_x)_m(Zr_{1-y}Ti_y)O_3$ is 100% by weight in the above described main component, z and w must be in the following ranges:

$0.1 \leq z \leq 5\%$ by weight
$0.3 \leq w \leq 8\%$ by weight.

The reason for this is as follows: When y exceeds 0.2, the absolute value of the temperature coefficient of dielectric constant TC (see the measuring method in the embodiment as described later) exceeds 30 ppm/°C., so that the temperature dependence of dielectric constant becomes high.

When m is less than 0.9 and more than 1.1, the dielectric ceramic composition cannot be sintered at temperatures of not more than 1000° C.

Similarly, when z is less than 0.1% by weight, the dielectric ceramic composition cannot be sintered at temperatures of not more than 1000° C. On the other hand, when z is more than 5% by weight, the specific resistance $\rho$ is less than $10^{10} \Omega\cdot\text{cm}$, which is too small.

Furthermore, when w is less than 0.3% by weight, the dielectric ceramic composition cannot be sintered at temperatures of not more than 1000° C. On the other hand, when w is more than 8% by weight, the dielectric constant $\epsilon$ is not more than 20 and the specific resistance $\rho$ is less than $10^{10} \Omega\cdot\text{cm}$.

Preferably, the above m and x are respectively selected to satisfy $0.9 \leq m \leq 1.03$ and $0 \leq x \leq 0.1$, whereby the composition can be sintered at not more than 920° C. and thus can be cofired together with an electrode made of silver. As a result, the composition can be sintered in a air atmosphere and thereby it is possible to reduce cost for sintereing as compared with sintering under reducing atmosphere.

ADDITIVE

In the dielectric ceramic composition according to the present invention, 2 to 30 parts by weight of the above described additive is mixed with 100 parts by weight of the above described main component. The reason for this is that the dielectric ceramic composition cannot be sintered at temperatures of not more than 1000° C. when the amount of the additive is less than 2 parts by weight, and the dielectric constant ε is not more than 20 and the Q value is not more than 2000 when it exceeds 30 parts by weight.

Meanwhile, the reason why a is not less than 0.01 nor more than 0.8 in terms of a molar ratio in the composition of the additive is that the dielectric ceramic composition cannot be sintered at temperatures of nor more than 1000° C. outside this range.

Preferably, the above value a is set so as to satisfy $0.01 \leq a \leq 0.65$, whereby a sintered body having flexural strength of 2000 kg/cm² or more.

As apparent from a composition formula of the above described additive, a is not less than 0.01. Accordingly, the additive inevitably contain $LiO_{\frac{1}{2}}$, $BO_{3/2}$, $SiO_2$ and RO. In the dielectric ceramic composition according to the present invention, the additive must inevitably contain $LiO_{\frac{1}{2}}$, $BO_{3/2}$, $SiO_2$ and RO. If one type of $LiO_{\frac{1}{2}}$, $BO_{3/2}$, $SiO_2$ and RO in the additive is not contained, the dielectric ceramic composition cannot be sintered at temperatures of not more than 1000° C.

In the present invention, there is provided a dielectric ceramic composition capable of obtaining dielectric ceramics which can be sintered at temperatures of not more than 1000° C. because the above described particular additive is mixed with the above described particular main component in the above described particular ratio, has a high dielectric constant ε of 20 to 35, has a temperature coefficient of dielectric constant whose absolute value is not more than 30 ppm/°C., has a Q value of not less than 2000, and has a specific resistance ρ at a temperature of 20° C. of not less than $10^{13}\Omega\cdot cm$.

Consequently, if the non-reduction type dielectric ceramic composition according to the present invention is used, it is possible to use a metal having high conductivity such as silver or copper as inner electrodes. Accordingly, the loss due to the electrode resistance in a high frequency band is low. If the dielectric ceramic composition is applied to a dielectric resonator, a filter, a multilayer capacitor or the like, therefore, it is possible to achieve superior high frequency characteristics.

The foregoing and other objects, features, aspects and advantages of the present invention will be more apparent from the following detailed description of the present invention.

DESCRIPTION OF THE PREFERRED EMBODIMENTS

The present invention will be made clear by describing the non-restrictive embodiment of the present invention.

First, respective powders of $CaZrO_3$, $SrZrO_3$, $SrTiO_3$ and $CaTiO_3$ are prepared as materials constituting a main component. The above described powders are prepared through the following procedure.

The $CaZrO_3$ powder is obtained by wet mixing $CaCO_3$ and $ZrO_2$ powders with each other, and drying a mixture obtained and calcining the same in air at a temperature of 1000° C. for two hours, followed by grinding. In addition, the $SrZrO_3$ powder is obtained by wet mixing $SrCO_3$ and $ZrO_2$ powders with each other, and drying a mixture obtained and calcining the same in air at a temperature of 1100° C. for two hours, followed by grinding. The $SrTiO_3$ powder is obtained by wet mixing $SrCO_3$ and $TiO_2$ powders with each other, and drying a mixture obtained and calcining the same in air at a temperature of 1150° C. for two hours, followed by grinding. Further, the $CaTiO_3$ powder is obtained by wet mixing $CaCO_3$ and $TiO_2$ powders, and drying a mixture obtained and calcining the same in air at a temperature of 1150° C. for two hours, followed by grinding.

Meanwhile, the above described $CaZrO_3$, $SrZrO_3$, $SrTiO_3$ and $CaTiO_3$ powders for constituting the main component may be prepared by the wet mixing method or may be prepared in the same manner as described above by the solid-phase method, followed by fine grinding in addition to the above described method. The particle diameters of the above described $CaZrO_3$, $SrZrO_3$, $SrTiO_3$ and $CaTiO_3$ powders are taken as 0.1 to 1 μm.

Furthermore, as materials for constituting the main component, $MnO_2$ and $SiO_2$ are prepared in addition to the above described four types of powders. In addition, $B_2O_3$, $SiO_2$, $Li_2CO_3$, $BaCO_3$, $SrCO_3$ and $MgCO_3$ are prepared as components constituting the additive. The respective components constituting the additive are weighed, wet mixed with each other, ground, evaporated and dried, melted at a temperature of 1000° C., wet ground and then, dried in accordance with the following table 4, to obtain additives A to K.

100 parts by weight of the calcined powders so weighed as to have a composition of the main component assigning each of sample numbers 1 to 45 shown in the tables 1 to 3, one type of the additives A to K shown in the table 4 having a weight shown in the tables 1 to 3, and 5 parts by weight of vinyl acetate serving as a binder are weighed, pure water having the same weight as that of the above described calcined powders is further wet mixed with the calcined powders, and a mixture obtained is evaporated and dried and is granulated, thereby to obtain each of powders assigning the sample numbers 1 to 45.

The powder obtained is then pressed at a pressure of 2 tons/cm² by a drying and pressing machine, thereby to obtain a formed body in a circular disc shape having a diameter of 20 mm and having a thickness of 1 mm.

The formed body obtained is left in air in the environment of 400° C. for two hours to remove the binder and then, is sintered at temperatures of 800° C. to 1000° C. in a reducing atmosphere containing hydrogen gas and nitrogen gas at a ratio of 3:100 (volume ratio) for two hours, to obtain each of sintered bodies assigning the sample numbers 1 to 45.

The electrical properties are measured with respect to each of the sintered bodies assigning the sample numbers 1 to 45 obtained in the above described manner through the following procedure.

The dielectric constant ε, the Q value, and the temperature coefficient of dielectric constant TC are measured at a temperature of 20° C. and under the conditions of 1 MHz and 1 Vrms. In addition, the specific resistance ρ is measured at a temperature of 20° C. The temperature coefficient of dielectric constant TC is a value expressed by the following equation:

$$TC\ (ppm/°C.) = \{(\epsilon 85 - \epsilon 20)/\epsilon 20\} \times \{1/(85 - 20)\} \times 10^6$$

where ε85 indicates a dielectric constant at a temperature of 85° C., and ε20 indicates a dielectric constant at a temperature of 20° C.

Furthermore, in the following tables 1 to 3, x, y and m are values expressed in terms of a molar ratio, and z and w are values expressed in terms of a weight ratio, as described above.

TABLE 1

| Sample Number | Main Component $(Ca_{1-x}Sr_x)_m(Zr_{1-y}Ti_y)O_{3-z}$ MnO$_2$-$_w$SiO$_2$ | | | | | Additive Part by Weight | Type |
|---|---|---|---|---|---|---|---|
| | m | x | y | z | w | | |
| 1 | 1.00 | 0.1 | 0 | 3 | 3 | 10 | E |
| 2 | 1.00 | 0.1 | 0.05 | 3 | 3 | 10 | E |
| 3 | 1.00 | 0.1 | 0.10 | 3 | 3 | 10 | E |
| 4 | 1.00 | 0.1 | 0.20 | 3 | 3 | 10 | E |
| *5 | 1.00 | 0.1 | 0.25 | 3 | 3 | 10 | E |
| *6 | 0.85 | 0.1 | 0.1 | 3 | 3 | 10 | E |
| 7 | 0.9 | 0.1 | 0.1 | 3 | 3 | 10 | E |
| 8 | 1.03 | 0.1 | 0.1 | 3 | 3 | 10 | E |
| 9 | 1.10 | 0.1 | 0.1 | 3 | 3 | 10 | E |
| *10 | 1.15 | 0.1 | 0.1 | 3 | 3 | 10 | E |
| 11 | 1.00 | 0 | 0.1 | 3 | 3 | 10 | E |
| 12 | 1.00 | 0.05 | 0.1 | 3 | 3 | 10 | E |
| 13 | 1.00 | 0.20 | 0.1 | 3 | 3 | 10 | E |
| 14 | 1.00 | 0.50 | 0.1 | 3 | 3 | 10 | E |
| 15 | 1.00 | 0.95 | 0.1 | 3 | 3 | 10 | E |
| 16 | 1.00 | 1.00 | 0.1 | 3 | 3 | 10 | E |
| *17 | 1.00 | 0 | 0.25 | 3 | 3 | 10 | E |
| *18 | 1.00 | 1.00 | 0.25 | 3 | 3 | 10 | E |

TABLE 2

| Sample Number | Main Component $(Ca_{1-x}Sr_x)_m(Zr_{1-y}Ti_y)O_{3-z}$ MnO$_2$-$_w$SiO$_2$ | | | | | Additive Part by Weight | Type |
|---|---|---|---|---|---|---|---|
| | m | x | y | z | w | | |
| 19 | 1.00 | 0 | 0 | 3 | 3 | 10 | E |
| 20 | 1.00 | 0.05 | 0 | 3 | 3 | 10 | E |
| 21 | 1.00 | 0.05 | 0.05 | 3 | 3 | 10 | E |
| 22 | 1.00 | 0.95 | 0.2 | 3 | 3 | 10 | E |
| 23 | 1.00 | 1.00 | 0.2 | 3 | 3 | 10 | E |
| *24 | 1.00 | 0.05 | 0.05 | 0.05 | 3 | 10 | E |
| 25 | 1.00 | 0.05 | 0.05 | 0.1 | 3 | 10 | E |
| 26 | 1.00 | 0.05 | 0.05 | 1 | 3 | 10 | E |
| 27 | 1.00 | 0.05 | 0.05 | 5 | 3 | 10 | E |
| *28 | 1.00 | 0.05 | 0.05 | 7 | 3 | 10 | E |
| *29 | 1.00 | 0.50 | 0.1 | 3 | 0.2 | 10 | E |
| 30 | 1.00 | 0.50 | 0.1 | 3 | 0.3 | 10 | E |
| 31 | 1.00 | 0.50 | 0.1 | 3 | 1 | 10 | E |
| 34 | 1.00 | 0.50 | 0.1 | 3 | 8 | 10 | E |
| *33 | 1.00 | 0.50 | 0.1 | 3 | 10 | 10 | E |
| *34 | 1.00 | 0.50 | 0.1 | 3 | 3 | 1 | E |

TABLE 3

| Sample Number | Main Component $(Ca_{1-x}Sr_x)_m(Zr_{1-y}Ti_y)O_{3-z}$ MnO$_2$-$_w$SiO$_2$ | | | | | Additive Part by Weight | Type |
|---|---|---|---|---|---|---|---|
| | m | x | y | z | w | | |
| 35 | 1.00 | 0.50 | 0.1 | 3 | 3 | 2 | E |
| 36 | 1.00 | 0.50 | 0.1 | 3 | 3 | 5 | E |
| 37 | 1.00 | 0.50 | 0.1 | 3 | 3 | 30 | E |
| *38 | 1.00 | 0.50 | 0.1 | 3 | 3 | 35 | E |
| *39 | 1.00 | 0.50 | 0.1 | 3 | 3 | 10 | A |
| 40 | 1.00 | 0.50 | 0.1 | 3 | 3 | 10 | B |
| 41 | 1.00 | 0.50 | 0.1 | 3 | 3 | 10 | C |
| 42 | 1.00 | 0.50 | 0.1 | 3 | 3 | 10 | D |
| 43 | 1.00 | 0.50 | 0.1 | 3 | 3 | 10 | F |
| 44 | 1.00 | 0.50 | 0.1 | 3 | 3 | 10 | G |
| 45 | 1.00 | 0.50 | 0.1 | 3 | 3 | 10 | H |
| *46 | 1.00 | 0.50 | 0.1 | 3 | 3 | 10 | I |
| *47 | 1.00 | 0.50 | 0.1 | 3 | 3 | 10 | J |
| *48 | 1.00 | 0.50 | 0.1 | 3 | 3 | 10 | K |
| *49 | 1.00 | 0.50 | 0.1 | 3 | 3 | 10 | L |
| *50 | 1.00 | 0.50 | 0.1 | 3 | 3 | 10 | M |

TABLE 4

Composition of Additive
$a(LiO_\frac{1}{2}-RO)-(1-a)(BO_{3/2}-SiO_2)$
mole percentage (%)

| Number | a* | LiO$_\frac{1}{2}$ | CaO | SrO | DaO | BO$_{3/2}$ | SiO$_2$ |
|---|---|---|---|---|---|---|---|
| A | 0.008 | 0.4 | 0.4 | 0 | 0 | 50 | 49.2 |
| B | 0.01 | 0.5 | 0.5 | 0 | 0 | 50 | 49 |
| C | 0.10 | 5 | 0 | 5 | 0 | 50 | 40 |
| D | 0.30 | 10 | 0 | 0 | 20 | 40 | 30 |
| E | 0.50 | 15 | 25 | 0 | 10 | 30 | 20 |
| F | 0.65 | 20 | 0 | 20 | 25 | 15 | 20 |
| G | 0.70 | 20 | 15 | 15 | 20 | 15 | 15 |
| H | 0.80 | 30 | 30 | 20 | 0 | 10 | 10 |
| I | 0.85 | 30 | 0 | 0 | 55 | 8 | 7 |
| J | 0.35 | 0 | 0 | 0 | 35 | 35 | 30 |
| K | 0.35 | 35 | 0 | 0 | 0 | 35 | 30 |
| L | 0.70 | 35 | 0 | 0 | 35 | 0 | 30 |
| M | 0.65 | 35 | 0 | 0 | 30 | 35 | 0 | cf. a* means the value expressed by mole ratio.

TABLE 5

| Sample Number | Sintering Temperature (°C.) | Dielectric Constant ε | Q Value | Specific Resistance ρ (Ω·cm) | TC (ppm/°C.) | Flexural Strength (kg/cm$^2$) | Sintering Properties |
|---|---|---|---|---|---|---|---|
| 1 | 900 | 22 | 2700 | >10$^{13}$ | 27 | 2400 | |
| 2 | 920 | 24 | 3200 | >10$^{13}$ | 14 | 2600 | |
| 3 | 920 | 27 | 3400 | >10$^{13}$ | 2 | 2500 | |
| 4 | 920 | 31 | 3600 | >10$^{13}$ | −24 | 2500 | |
| 5 | 950 | 34 | 3700 | >10$^{13}$ | −52 | 2100 | |
| 6 | 1000 | — | — | — | — | — | Not Sintered |
| 7 | 920 | 25 | 3100 | >10$^{13}$ | −13 | 3100 | |
| 8 | 920 | 25 | 3400 | >10$^{13}$ | 4 | 2800 | |
| 9 | 950 | 26 | 3200 | >10$^{13}$ | 8 | 2400 | |
| 10 | 1000 | — | — | — | — | — | Not Sintered |
| 11 | 900 | 26 | 3100 | >10$^{13}$ | −11 | 2600 | |
| 12 | 900 | 24 | 3600 | >10$^{13}$ | −14 | 3200 | |
| 13 | 950 | 24 | 3200 | >10$^{13}$ | −2 | 2800 | |
| 14 | 950 | 27 | 2800 | >10$^{13}$ | 11 | 2400 | |
| 15 | 980 | 28 | 3300 | >10$^{13}$ | 17 | 2500 | |
| 16 | 980 | 25 | 3500 | >10$^{13}$ | 23 | 2200 | |
| 17 | 950 | 31 | 3400 | >10$^{13}$ | −87 | 2700 | |

TABLE 6

| Sample Number | Sintering Temperature (°C.) | Dielectric Constant $\epsilon$ | Q Value | Specific Resistance $\rho$ ($\Omega \cdot$ cm) | TC (ppm/°C.) | Flexural Strength (kg/cm$^2$) | Sintering Properties |
| --- | --- | --- | --- | --- | --- | --- | --- |
| 18 | 950 | 33 | 3300 | $>10^{13}$ | −45 | 2100 | |
| 19 | 920 | 25 | 3200 | $>10^{13}$ | 16 | 2200 | |
| 20 | 920 | 23 | 3300 | $>10^{13}$ | 19 | 2500 | |
| 21 | 920 | 28 | 3300 | $>10^{13}$ | 4 | 2400 | |
| 22 | 950 | 33 | 3100 | $>10^{13}$ | −12 | 2500 | |
| 23 | 950 | 28 | 2800 | $>10^{13}$ | −7 | 3000 | |
| 24 | 1000 | — | — | — | — | — | Not Sintered |
| 25 | 920 | 25 | 3100 | $>10^{13}$ | 8 | 2600 | |
| 26 | 920 | 26 | 3400 | $>10^{13}$ | 5 | 2700 | |
| 27 | 900 | 28 | 3700 | $>10^{13}$ | −5 | 2400 | |
| 28 | 920 | 26 | 1500 | $<10^{10}$ | −14 | 2500 | |
| 29 | 1000 | — | — | — | — | — | Not Sintered |
| 30 | 950 | 31 | 3700 | $>10^{13}$ | −8 | 2200 | |
| 31 | 950 | 29 | 3500 | $>10^{13}$ | −5 | 2200 | |
| 32 | 900 | 25 | 3200 | $>10^{13}$ | 12 | 2300 | |

TABLE 7

| Sample Number | Sintering Temperature (°C.) | Dielectric Constant $\epsilon$ | Q Value | Specific Resistance $\rho$ ($\Omega \cdot$ cm) | TC (ppm/°C.) | Flexural Strength (kg/cm$^2$) | Sintering Properties |
| --- | --- | --- | --- | --- | --- | --- | --- |
| 33 | 900 | 18 | 1300 | $>10^{13}$ | 24 | 2100 | |
| 34 | 1000 | — | — | — | — | — | Not Sintered |
| 35 | 980 | 34 | 3800 | $>10^{13}$ | −18 | 2700 | |
| 36 | 950 | 30 | 3600 | $>10^{13}$ | −7 | 2600 | |
| 37 | 870 | 24 | 2400 | $>10^{13}$ | 27 | 2100 | |
| 38 | 850 | 16 | 180 | $>10^{13}$ | 120 | 1700 | |
| 39 | 1000 | — | — | — | — | — | Not Sintered |
| 40 | 920 | 25 | 3500 | $>10^{13}$ | 8 | 2300 | |
| 41 | 920 | 25 | 3700 | $>10^{13}$ | 14 | 2400 | |
| 42 | 950 | 27 | 2800 | $>10^{13}$ | −12 | 2200 | |
| 43 | 920 | 26 | 3400 | $>10^{13}$ | 11 | 2100 | |
| 44 | 950 | 27 | 2700 | $>10^{13}$ | 14 | 1700 | |
| 45 | 950 | 23 | 2300 | $>10^{13}$ | 22 | 1500 | |
| 46 | — | — | — | — | — | — | Not Sintered |
| 47 | — | — | — | — | — | — | Not Sintered |
| 48 | — | — | — | — | — | — | Not Sintered |
| 49 | — | — | — | — | — | — | Not Sintered |
| 50 | — | — | — | — | — | — | Not Sintered |

Meanwhile, * indicates that a sample with "*mark" is a sintered body having a composition outside the range in the present invention.

As can be seen from the tables 1 to 7, in the sintered body assigning the sample number 5, the temperature coefficient of dielectric constant TC is −52 ppm/°C., whose absolute value is large. The reason for this is probably that y=0.25, which value is outside the range of y in the present invention, that is, the content of Ti is high.

Furthermore, in the sintered body assigning the sample number 6, the dielectric ceramic composition is not sintered at a temperature of 1000° C. The reason for this is that m=0.85, which value is outside the range of m in the present invention, that is, the mixture ratio of $Ca_{1-x}Sr_{1-x}$ in the main component is small.

Also in the sintered body assigning the sample number 10, the dielectric ceramic composition is not sintered at a temperature of 1000° C. The reason for this is that m=1.15, which value is outside the range of m in the present invention.

In both the sintered bodies assigning the sample numbers 17 and 18, the absolute values of the temperature coefficients of dielectric constant TC are respectively 87 and 45, which are large. The reason for this is probably that y=0.25, that is, the content of Ti is high.

Furthermore, in the sintered body assigning the sample number 24, the dielectric ceramic composition is not sintered at a temperature of 1000° C. The reason for this is probably that z=0.05% by weight, that is, the content of $MnO_2$ is low.

In the sintered body assigning the sample number 28, the Q value is 1500, which is small. The reason for this is probably that z=7% by weight, which value is outside the range of z in the present invention, that is, the content of $MnO_2$ is low.

In the sintered body assigning the sample number 29, the dielectric ceramic composition is not sintered at a temperature of 1000° C. The reason for this is probably that $w = 0.2\%$ by weight, which value is outside the range of w in the present invention, that is, the content of $SiO_2$ is low.

In the sintered body assigning the sample number 33, the dielectric constant $\epsilon$ is 18, which is low, the Q value is 1300, which is low, and the specific resistance $\rho$ is less than $10^{10} \Omega \cdot cm$. The reason for this is that $w = 10\%$ by weight, that is, the content of $SiO_2$ is high.

In the sintered body assigning the sample number 34, the dielectric ceramic composition is not sintered at a temperature of 1000° C. The reason for this is that the amount of the additive E is 1 part by weight.

In the sintered body assigning the sample number 38, the dielectric constant $\epsilon$ and the Q value are respectively 16 and 180, which are low, and the absolute value of the temperature coefficient of dielectric constant TC is 120, which is very large. The reason for this is probably that the amount of the additive E is 35 parts by weight, so that the sintered body has a composition outside the range in the present invention, that is, the amount of the additive E is too large.

In the sintered body assigning the sample number 46, the dielectric ceramic composition is not sintered at a temperature of 1000° C. The reason for this is probably that the additive A wherein the mole ratio of a is 0.82 is used as an additive. Similarly, also in the respective sintered bodies assigning the sample numbers 47 to 50, the dielectric ceramic compositions are not sintered at a temperature of 1000° C. The reason for this is that the additives J, K, L, and M are additives outside the range in the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-reduction dielectric ceramic composition, which is characterized by containing 100 parts by weight of $(Ca_{1-x}Sr_x)_m(Zr_{1-y}Ti_y)O_3$-$zMnO_2$-$wSiO_2$ serving as a main component and 2 to 30 parts by weight of an additive, said x, y and m satisfying the following relationships in terms of a molar ratio:
    $0 \leq x \leq 1.0$
    $0 \leq y \leq 0.2$
    $0.9 \leq m \leq 1.1$ said z and w being in the following ranges when the amount of $(Ca_{1-x}Sr_x)_m(Zr_{1-y}Ti_y)O_3$ is 100% by weight in said main component:
    $0.1 \leq z \leq 5\%$ by weight
    $0.3 \leq w \leq 8\%$ by weight said additive being $a(LiO_{\frac{1}{2}}\text{-}RO)\text{-}(1\text{-}a)(BO_{3/2}\text{-}SiO_2)$, where RO is at least one of SrO, BaO and CaO, and a is not less than 0.01 nor more than 0.8 in terms of a molar ratio.

2. A non-reduction dielectric ceramic composition according to claim 1, wherein said m and x satisfy $0.9 \leq m \leq 1.03$ and $0 \leq x \leq 0.1$, respectively.

3. A non-reduction dielectric ceramic composition according to claim 1, wherein said a satisfies $0.01 \leq a \leq 0.65$.

4. A non-reduction dielectric ceramic composition according to claim 2, wherein said a satisfies $0.01 \leq a \leq 0.65$.

* * * * *